(12) United States Patent
Ritter et al.

(10) Patent No.: US 11,194,817 B2
(45) Date of Patent: Dec. 7, 2021

(54) ENTERPRISE OBJECT SEARCH AND NAVIGATION

(71) Applicant: SAP SE, Walldorf (DE)

(72) Inventors: Gerd Ritter, Heidelberg (DE); Guenter Wilmer, Mannheim (DE)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 16/701,973

(22) Filed: Dec. 3, 2019

(65) Prior Publication Data
US 2021/0165798 A1 Jun. 3, 2021

(51) Int. Cl.
*G06F 17/00* (2019.01)
*G06F 16/2457* (2019.01)
*G06F 16/248* (2019.01)
*G06F 16/25* (2019.01)

(52) U.S. Cl.
CPC ...... *G06F 16/24575* (2019.01); *G06F 16/248* (2019.01); *G06F 16/252* (2019.01)

(58) Field of Classification Search
CPC . G06F 16/24575; G06F 16/252; G06F 16/248
See application file for complete search history.

(56) References Cited

U.S. PATENT DOCUMENTS

| | | | | |
|---|---|---|---|---|
| 5,864,871 | A * | 1/1999 | Kitain | G06F 16/10 |
| 6,587,855 | B1 * | 7/2003 | Ellmann | G06F 16/248 |
| 8,380,750 | B2 * | 2/2013 | Gorelik | G06F 16/248 |
| | | | | 707/802 |
| 8,924,269 | B2 * | 12/2014 | Seubert | G06Q 40/00 |
| | | | | 705/35 |

OTHER PUBLICATIONS

Muyuan Wang, Zhiwei Li, Lie Lu, Wei-Ying Ma, and Naiyao Zhang. Web object indexing using domain knowledge. In Proceedings of the eleventh ACM SIGKDD international conference on Knowledge discovery in data mining (KDD '05). Association for Computing Machinery, New York, NY, USA, 294-303. August (Year: 2005).*

* cited by examiner

*Primary Examiner* — Greta L Robinson
(74) *Attorney, Agent, or Firm* — Buckley, Maschoff & Talwalkar LLC (57) ABSTRACT

A system includes reception of a query input by a user into a user interface, determination, in response to reception of the query, of a plurality of query results, each of the query results associated with a respective object instance of one of a plurality of object types, where the plurality of object types comprise a master data object type and a report object type, and presentation of the plurality of query results to the user, the plurality of query results comprising a first indicator of a first query result associated with an instance of the report object type and a second indicator a second query result associated with an instance of the master data object type, where the first indicator is selectable by the user to cause execution of the instance of the report object type to create a report and presentation of the report to the user, and where the second indicator is selectable by the user to cause retrieval and presentation of the instance of the master data object type to the user.

17 Claims, 11 Drawing Sheets

Enterprise Application — Opportunities

| | | External ID | ID | Name | Account | Top Level Account | Primary Contact | Start Date | Close Date | Sales Cycle | Sales Phase 1 Test |
|---|---|---|---|---|---|---|---|---|---|---|---|
| | | 37583 | 8432 | Malini_12234355656666666666... | Pfizer Ireland. Pharmaceuticals Ltd. | Superquinn | Elaine Razaghian | 27.04.2016 | 31.05.2016 | General oppor... | Identify opport... |
| | | | 7162 | aninddas | | | | 12.01.2016 | 11.02.2016 | SLDC | analysis adding2 |
| | | | 20313 | wreqwrqwr | Northern Lite Corp.hhh C2001 | | | 13.03.2019 | 12.04.2019 | General oppor... | Identify opport... |
| | | | 2939 | Oppoct3 | bncx | bncx | Ji | 03.10.2014 | 03.10.2014 | General oppor... | Identify opport... |
| | | | 2807 | Avention Marketing Lead Testing... | US District Court Clerk | | James High | 25.09.2014 | 25.09.2014 | General oppor... | Identify opport... |
| | | | 2941 | Goo... | Seema Shetty Test Mobile | | | 02.10.2014 | 02.10.2014 | General oppor... | Identify opport... |
| | | 36752 | 8431 | !Malini_Test_20 | Pfizer Ireland. Pharmaceuticals Ltd. | Superquinn | Elaine Razaghian | 27.04.2016 | 01.06.2016 | General oppor... | Identify opport... |
| | | | 6177 | Child of Zopp11 | Almika Almika | | | 04.10.2016 | 19.10.2016 | SLDC | design |
| | | | ZJD_QXL_OP... | zjd_qxl_oppa6 | | | | 14.11.2017 | 14.12.2017 | Aspen Opport... | AO-Identify |
| | | | 19232 | !yi opp 20 | Surge Topic :Oracle T | | | 14.06.2018 | 14.07.2018 | General oppor... | Identify opport... |
| | | | 19234 | !yi opp 041 | Dr. Support | | | 14.06.2018 | 14.07.2018 | General oppor... | Identify opport... |
| | | | 2761 | new edge_p | Surge TopicEdgebridge | 1 Testing Account test | Lori Bales | 23.09.2014 | 23.09.2014 | General oppor... | Identify opport... |
| | | 18037 | 896 | 123_MCPG_21stFeb_try10 | greenfield | | Almika | 21.02.2014 | 22.02.2014 | Ztest | test1 |
| | | | 15516 | Malini_test_1 | 07070Acct | | Blanca Collombo | 10.07.2017 | 12.03.2018 | General oppor... | Close |
| | | 38023 | 14435 | Test MSH - 17-May-17 - QXL | SZ: 04112013 #1 7 Newe2 | | Fritz Bauer | 16.05.2017 | 15.06.2017 | General oppor... | Identify opport... |
| | | 37510 | 15393 | SZ 23.06.2017 14.05 | SZ: 04112013 #1 7 Newe2 | | Fritz Bauer | 23.06.2017 | 03.07.2017 | General oppor... | Identify opport... |
| | | 37996 | 14687 | MSH - Note History - 300502 | SZ: 04112013 #1 7 Newe2 | | Fritz Bauer | 30.05.2017 | 29.06.2017 | General oppor... | Identify opport... |
| | | | 10635 | UK4NOV4 Updated | SZ: 04112013 #1 7 Newe2 | | Frank Waller | 14.11.2016 | 14.12.2016 | General oppor... | Identify opport... |
| | | | 10632 | UK4NOV4 Updated | SAP | | Frank Waller | 14.11.2016 | 14.12.2016 | General oppor... | Identify opport... |
| | | | 3154 | 1502_sales_opp | | | Lead | 28.10.2014 | 28.10.2014 | General oppor... | Decision |
| | | | 6768 | aninddas123 | Kixo | | Thomas Matthews | 02.12.2015 | 01.01.2016 | SLDC | analysis adding2 |
| | | 37504 | 8348 | MALINI_TEST1 | Pfizer Ireland. Pharmaceuticals Ltd. | Superquinn | Elaine Razaghian | 27.04.2016 | 30.05.2016 | General oppor... | Identify opport... |

Sidebar:
- Home
- Calender
- Feed
- Recent History
- > Business Analytics
- > Business Configuration
- > Service Entitlements
- > Customers
- > People
- > Sales Campaign
- > Sales
- Sales Leads
- Leads
- Deal Registration
- Opportunities
- Sales Quotes
- Sales Orders
- Forecasts
- Forecast Administration
- Pipeline Simulation
- Territories
- Realignment Runs
- Sales Target Planning
- > Activities
- > Analysis
- > Competitors
- > Products My Asian open opportunities (7796)

| | | | | | | Opportunities | | | | |
|---|---|---|---|---|---|---|---|---|---|---|
| External ID | ID | Name | Account | Top Level Account | Primary Contact | Start Date | Close Date | Sales Cycle | Sales Phase 1 Test |
| 37563 | 8432 | Malini_12234355666666666... | Pfizer Ireland. Pharmaceuticals Ltd. | Superquinn | Elaine Razaghian | 27.04.2016 | 31.05.2016 | General oppor...Identify opport... |
| | 7162 | aninddas | | | | 12.01.2016 | 11.02.2016 | SLDC | analysis adding2 |
| | 20313 | wreqwrqwr | Northern Lite Corp.hhh C2001 | | | 13.03.2019 | 12.04.2019 | General oppor...Identify opport... |
| | 2939 | Oppoct3 | bncx | | Ji | 03.10.2014 | 03.10.2014 | General oppor...Identify opport... |
| | 3154 | 1502_sales_opp | SAP | | Lead | 28.10.2014 | 28.10.2014 | General oppor...Decision |
| | 6768 | aninddas123 | Kixo | | Thomas Matthews | 02.12.2015 | 01.01.2016 | SLDC | analysis adding2 |
| 37504 | 8348 | MALINI_TEST1 | Pfizer Ireland. Pharmaceuticals Ltd. | Superquinn | Elaine Razaghian | 27.04.2016 | 30.05.2016 | General oppor...Identify opport... |

ENTERPRISE OBJECT SEARCH AND NAVIGATION

BACKGROUND

Enterprise software systems receive, generate, and store data related to many aspects of an enterprise. The data may consist of millions of data records, each of which may correspond to a particular instance of a particular type of enterprise data. Conventional systems may provide search functionality to facilitate identification of desired enterprise data.

According to a conventional searching paradigm, a user navigates to a user interface of an application which displays records of the type of data object to be located. The user then enters tokens into a search or query field in order to filter the records based on the tokens. The user may then select a record from the resulting filtered list in order to open the selected record.

Improved systems for searching of and navigating to enterprise data objects are desired.

BRIEF DESCRIPTION OF THE DRAWINGS

FIG. 4 is a view of a user interface displaying an object in response to selection of a corresponding query result according to some embodiments.

DETAILED DESCRIPTION

The following description is provided to enable any person in the art to make and use the described embodiments. Various modifications, however, will remain readily-apparent to those in the art.

Generally, some embodiments facilitate the searching of many types of enterprise objects and the display of search results grouped by object type (e.g., work lists, reports, documents, master data). Moreover, according to some embodiments, selection of a search result results in efficient navigation to a corresponding object instance. Search results may include function keywords whose corresponding navigation steps facilitate execution of a function on the enterprise data (e.g., create appointment, submit). Such embodiments may efficiently provide enterprise search and function execution via a same user interface metaphor.

Figure 1:
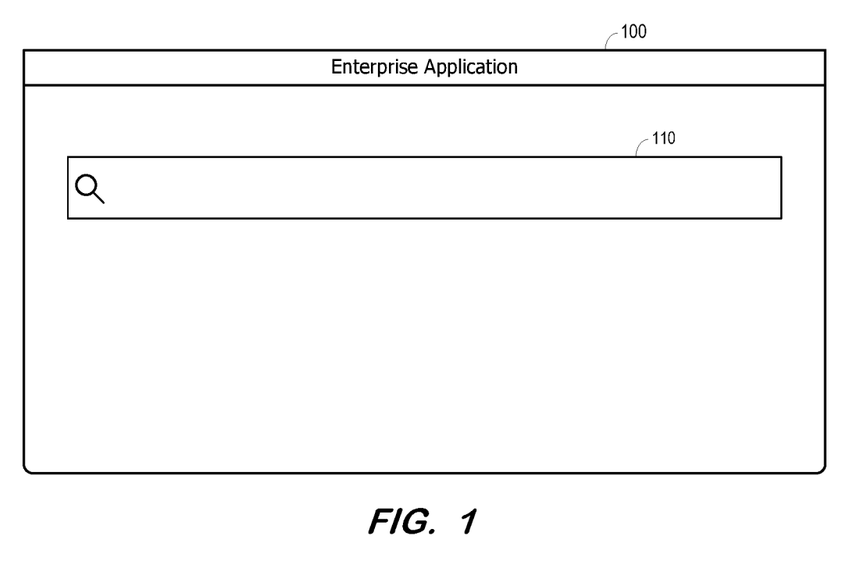
FIG. 1 is a view of a user interface to receive a query according to some embodiments.

FIG. 1 illustrates interface 100 according to some embodiments. Interface 100 may be presented on a display of a computing system executing a client application for reading, creating, updating and deleting enterprise data. Such a client application may allow a user to input query tokens via an interface such as interface 100. A will be described in more detail below, embodiments are not limited to interface 100.

Figure 2:
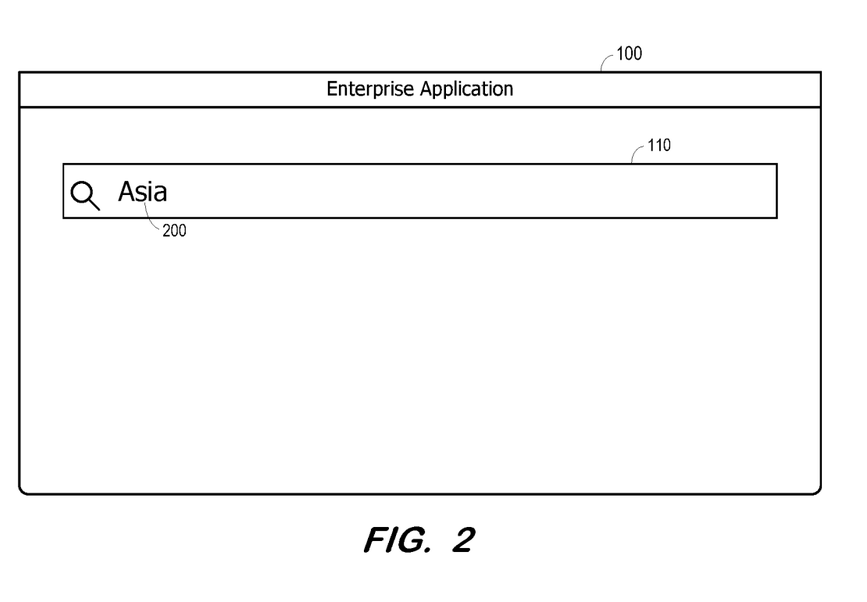
FIG. 2 is a view of a user interface including a query according to some embodiments.

Interface 100 includes input field 110. A user may input query tokens into field 110 using a keyboard or other input device, such as a microphone. The tokens are intended to represent a query for retrieving desired data from a data source. In the present example illustrated in FIG. 2, the user has input the token "Asia" into input field 110.

A search is then initiated based on the input tokens. The search may be initiated in response to user selection of an Enter key, a Submit icon, a detected pause in the user entry of tokens, or based on any suitable trigger that is or becomes known.

According to some embodiments, the search is performed over data and/or metadata associated with enterprise data objects. The data and/or metadata may be indexed as is known in the art, such that the search occurs over the corresponding indices. The search algorithm may allow wildcards, support fuzzy searching, and employ any searching technique that is or becomes known. The searched data and/or metadata may be stored locally, remotely, and/or in distributed systems. Embodiments are not limited to any particular implementations for storing or for accessing enterprise data objects.

Figure 3:
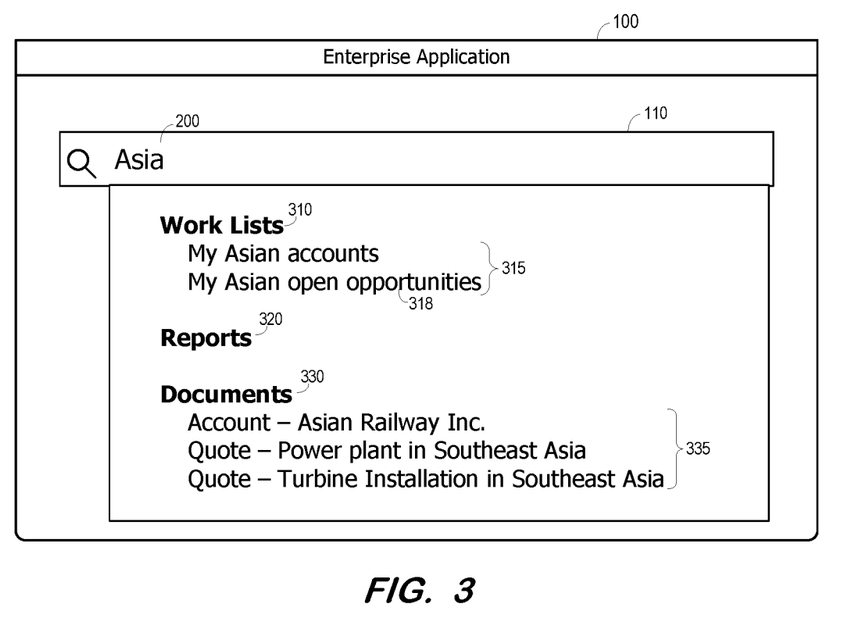
FIG. 3 is a view of a user interface including a query and corresponding groups of query results according to some embodiments.

FIG. 3 illustrates search results displayed according to some embodiments. The search results are grouped under group headers Work Lists 310, Reports 320 and Documents 330. Embodiments are not limited to these three object types.

The search results may take into account roles and permissions of the current user. For example, the search algorithm might only search data objects which the user is permitted to access, based on the user role and permissions associated with the data objects.

Each search result represents an instance of the object type of its corresponding header. For example, search results 315 are names of Work List instances which are associated with the "Asia" query token. Similarly, search result 322 is a name of a Report instance associated with the "Asia" query token and search results 335 are names of Document instances which are associated with the "Asia" query token.

According to some embodiments, each search result is a selectable indicator (e.g., hyperlink) of its associated object instance. Selection of a search result causes presentation of a view of the associated object instance. Notably, the steps executed to present a view of an instance of one type of object (e.g., a Work List) may differ from the steps executed to present a view of an instance of a different type of object (e.g., a Report).

Continuing the present example, it will be assumed that the user selects search result 318 of FIG. 3. In response, a query associated with this Work List is fired on the stored enterprise data object instances. FIG. 4 illustrates a result set of the executed query according to some embodiments. Conventionally, in order to access the same result set, the user would have had to navigate to the Opportunities section of the application and enter or select an appropriate query therein.

Figure 5:
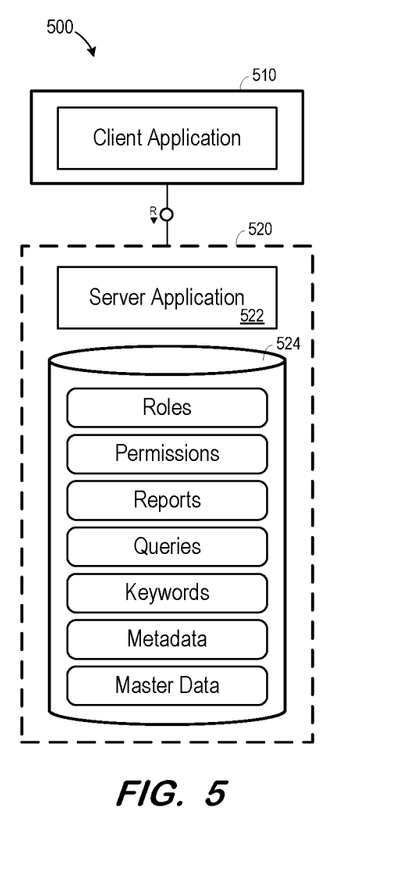
FIG. 5 is a block diagram of a system architecture according to some embodiments.

Architecture 500 includes data server 510 and client system 520. Generally, data server 510 receives requests from client 520 and provides results to client 520 based on those requests by executing server application 512. Server application 512 may be separated from or closely integrated with data store 514. Server application 512 may be executed completely on the database platform of data store 514, without the need for an additional server. Architecture 500 may be implemented using any client-server architecture that is or becomes known, including but not limited to on-premise, cloud-based and hybrid architectures.

In one specific example, client 520 executes client application 522 to access server application 512. Server application 512 may comprise an enterprise application for reading, creating, updating and deleting enterprise data. The user enters a query into a user interface presented by client application 522, and client 520 forwards a request based on the query to server 510. Server application 512 may execute a search and provide search results to client 520 as described herein.

Client application 522 may display the search results as described with respect to FIG. 3. The user may then operate client application 522 to select a search result. As described above, selection of a search result results in operation of client application 522 and a corresponding response from server application 512 which is dependent on the object type associated with the search result. In one example, server application 522 generates an SQL script based on the selection and forwards the SQL script to data store 514. Data store 514 executes the SQL script to return a result set based on data of data store 514, and client 520 generates and displays the result set.

Data store 514 includes data defining roles and permissions of potential users of server application 512. As described above, the roles and permissions may be used during execution of a search based on query tokens submitted by a user. More specifically, information regarding roles and permissions may be used during search execution to ensure that a user is provided only with search results which correspond to object instances to which the user is allowed access.

As is known in the art, data store 514 may store instances of master data (e.g., data records) and metadata defining the structure and interrelations of the master data. Data store 514 also stores object instances which may be represented in search results. These instances may include definitions of specific reports, work lists, command keywords (e.g., create, new, submit) and associated actions.

The data of data store 514 may comprise one or more of conventional tabular data, row-based data, column-based data, and object-based data. Moreover, the data may be indexed and/or selectively replicated in an index to allow fast searching and retrieval thereof. Data store 514 may support multi-tenancy to separately support multiple unrelated clients by providing multiple logical database systems which are programmatically isolated from one another.

Data store 514 may comprise any query-responsive data source or sources that are or become known, including but not limited to a structured-query language (SQL) relational database management system. Data store 514 may comprise a relational database, a multi-dimensional database, an eXtendable Markup Language (XML) document, or any other data storage system storing structured and/or unstructured data. The data of data store 514 may be distributed among several relational databases, dimensional databases, and/or other data sources. Embodiments are not limited to any number or types of data sources.

Data store 514 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 520 may comprise one or more devices executing program code of an application for presenting user interfaces to allow interaction with server 510. The user interfaces may be suited for reporting, data analysis, and/or any other functions based on the data of data store 514.

Figure 6:
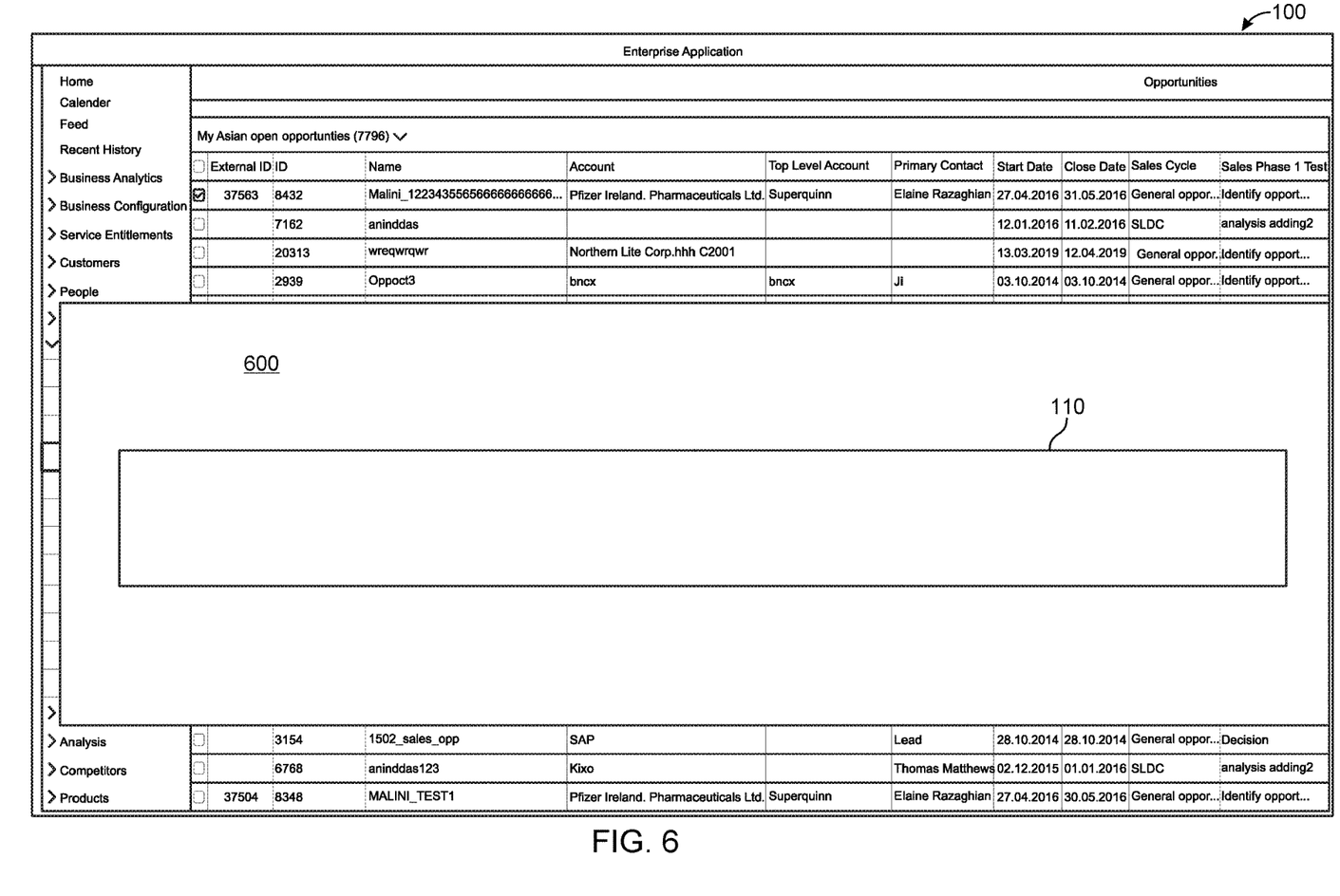
FIG. 6 is a view of a user interface to receive a query according to some embodiments.

Embodiments are not limited to the search query interface of FIG. 1. For example, FIG. 6 illustrates pop-up window 600 which may be invoked via a keystroke or other user input while the user is viewing another user interface of a client application. Window 610 includes input field 610 for receiving query tokens as described above. Results of any input query are not limited to the object type of the user interface displayed at the time window 600 was invoked. In other embodiments, each user interface of a client application may include a query input field which operates as described herein, again without regard to the object type with which the user interface is associated.

Figure 7:
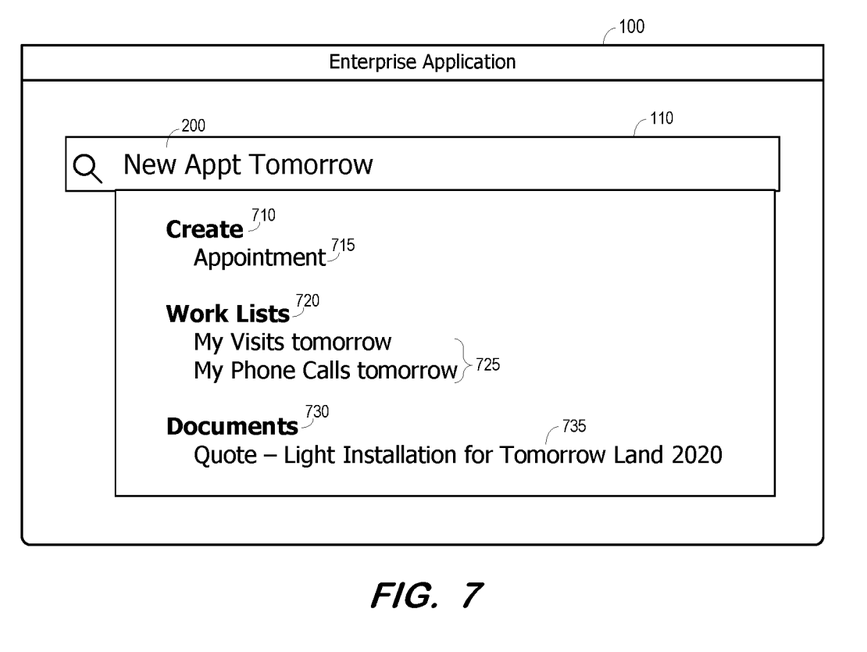
FIG. 7 is a view of a user interface including a query and corresponding groups of query results according to some embodiments.
Figure 8:
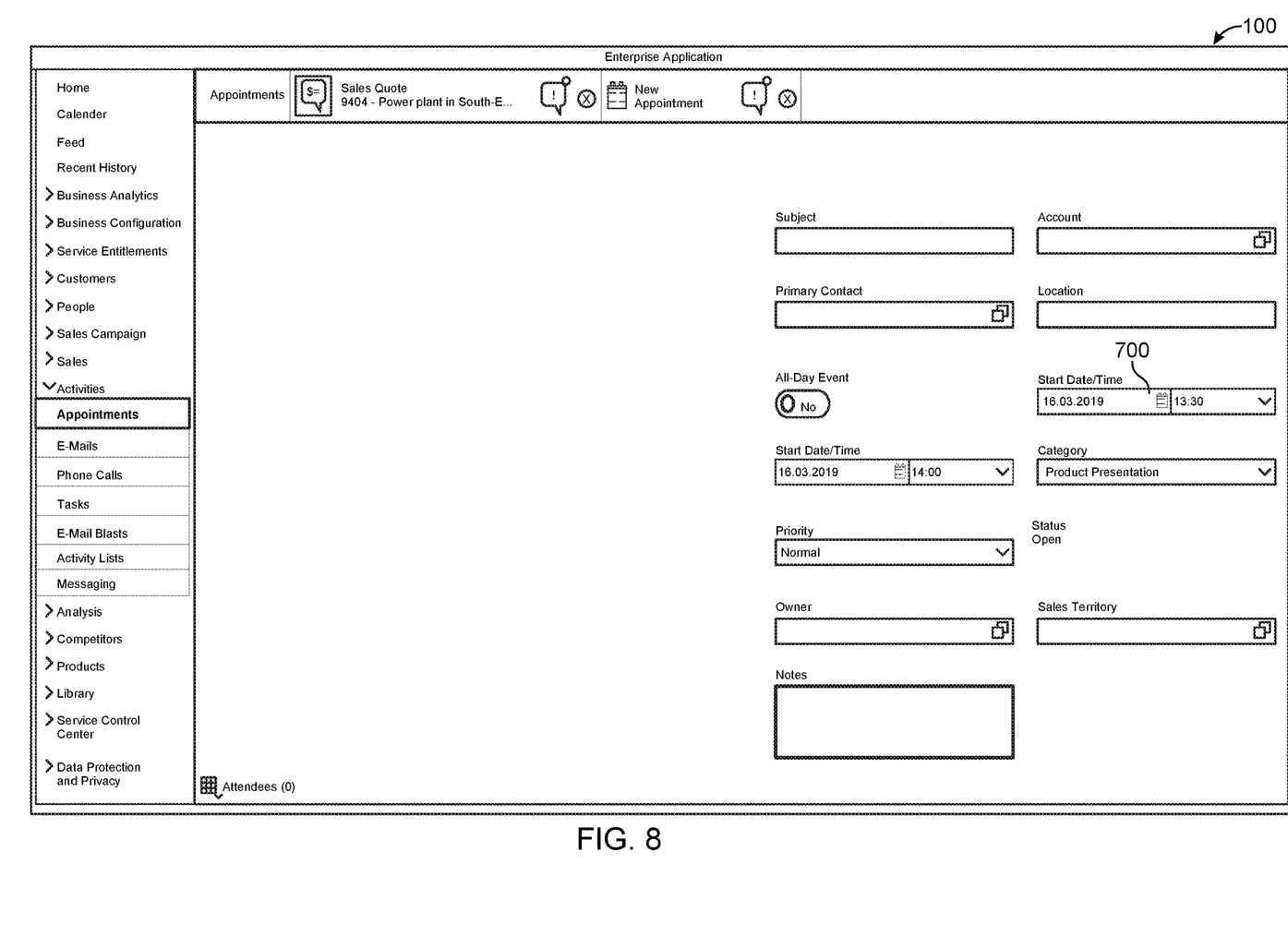
FIG. 8 is a view of a user interface displaying an object in response to selection of a corresponding query result according to some embodiments.

FIGS. 7 and 8 illustrate another example of the display and selection of query results according to some embodiments. As shown, a user has entered a query "New Appt Tomorrow" into field 110. A search is executed based on this query, resulting in the search results displayed in FIG. 7. As previously described, the search results may take into account roles and permissions of the current user.

The search results are grouped under group headers Create 710, Work Lists 720 and Documents 730. Each search result represents an instance of the object type of its corresponding header. Each of query results 725 under Work Lists 720 may be selected to execute a query to retrieve and display a corresponding work list as described above. Query result 735 may be selected to retrieve and display a corresponding document instance.

Create 710 represents a command for performing an action, and corresponding search result 715 indicates an object type on which the command may be performed. For example, the search token "New" was identified during search execution as corresponding to the command "Create" and the token "Appt" was identified as corresponding to the master data object Appointment. Systems may support any other suitable commands, including but not limited to edit, delete, etc. Search result 712 may also include metadata reflecting the query token "Tomorrow".

Selection of query result 715 causes display of creation user interface 800 corresponding to the Appointment object as shown in FIG. 8. Another creation user interface may be displayed in the case that the search result was associated with a different object. As shown, Start Date field 810 has been prepopulated with tomorrow's date, based on metadata of search result 715 which was generated based on the query token "tomorrow".

Figure 9:
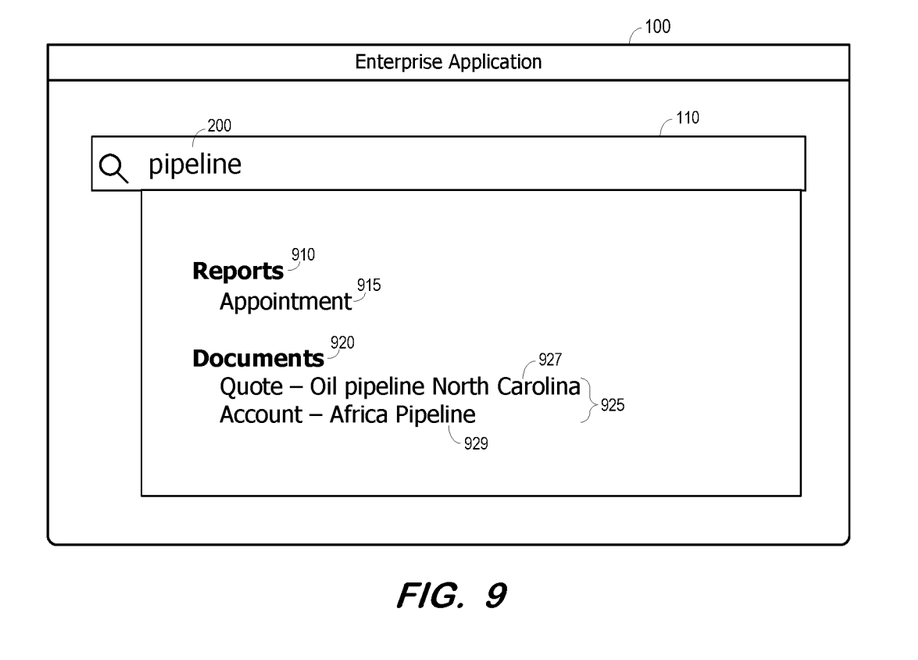
FIG. 9 is a view of a user interface including a query and corresponding groups of query results according to some embodiments.

According to the example of FIG. 9, a user has entered a query "pipeline" into field 110 of interface 100. A search is executed based on this query, resulting in search results grouped under group headers Reports 910 and Documents 920. Each search result represents an instance of the object type of its corresponding header. Each of query results 925 under Documents 920 may be selected to retrieve and display a corresponding document instance.

Figure 10:
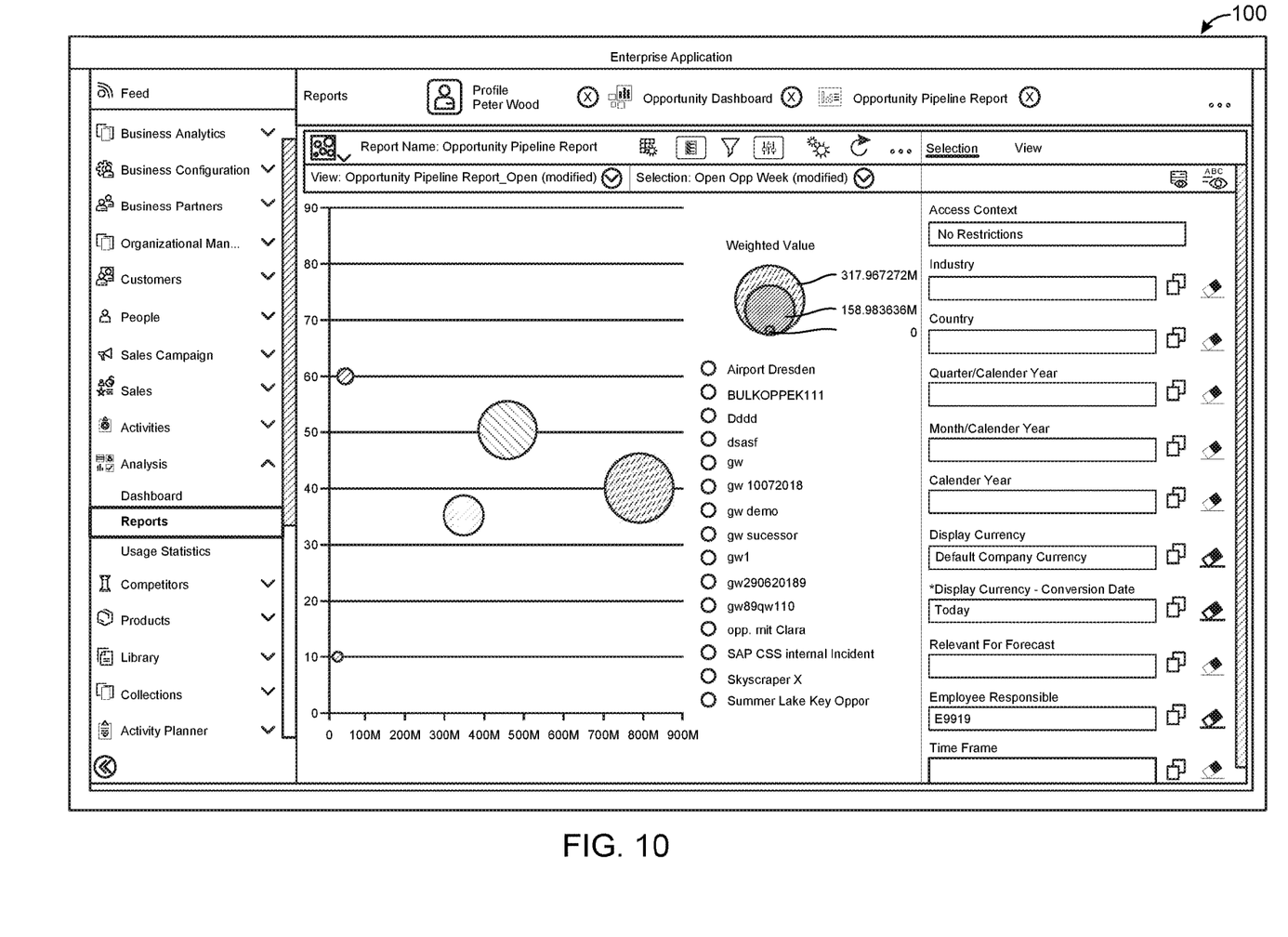
FIG. 10 is a view of a user interface displaying an object in response to selection of a corresponding query result according to some embodiments.

Selection of search result 915 results in execution and display of a corresponding report. As is known in the art, execution of a report may include execution of one or more queries associated with the report and presentation of the result set(s) of the one or more queries in a manner specified by the report. FIG. 10 illustrates Opportunity Pipeline report 1000 according to some embodiments. Embodiments therefore provide an efficient system for quickly accessing many different types of enterprise objects and/or executing commands thereon from a single search interface.

Figure 11:
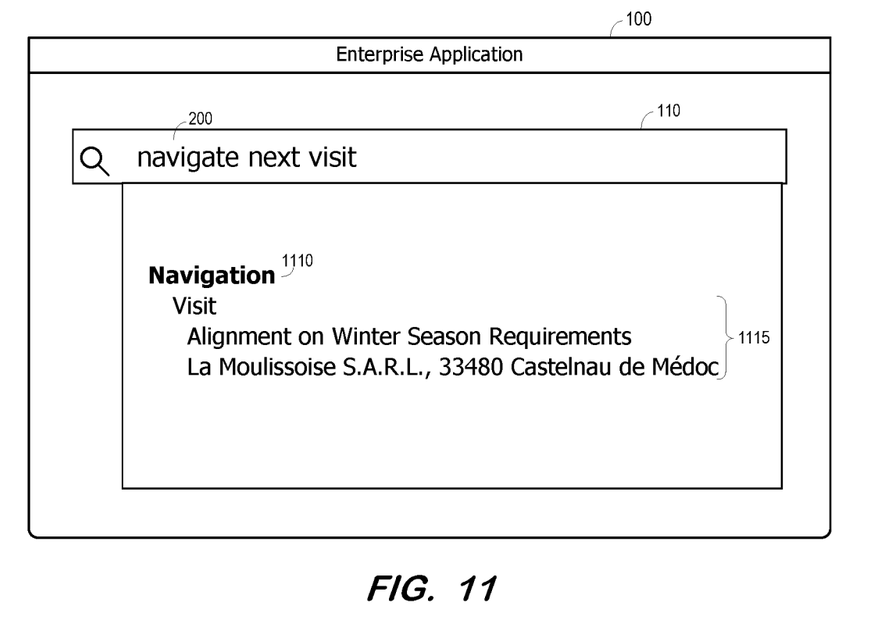
FIG. 11 is a view of a user interface including a query and a corresponding query result according to some embodiments.

Embodiments may also support search and execution of commands which use information from stored master data instances. FIG. 11 depicts entry of query "navigate next visit" into field 110 of interface 100. Navigation grouping 1110 specifies a type of command associated with search result 1115. Accordingly, a search has been executed based on the input query to identify a corresponding command (i.e., Navigate), a type of data object (i.e., Visit) and an instance of the data object (i.e., a "next" visit). Selection of search result 1115 therefore causes execution of a navigation function, with the specified address as the navigation destination. The navigation function may be executed by an integrated or separate navigation application.

Figure 12:
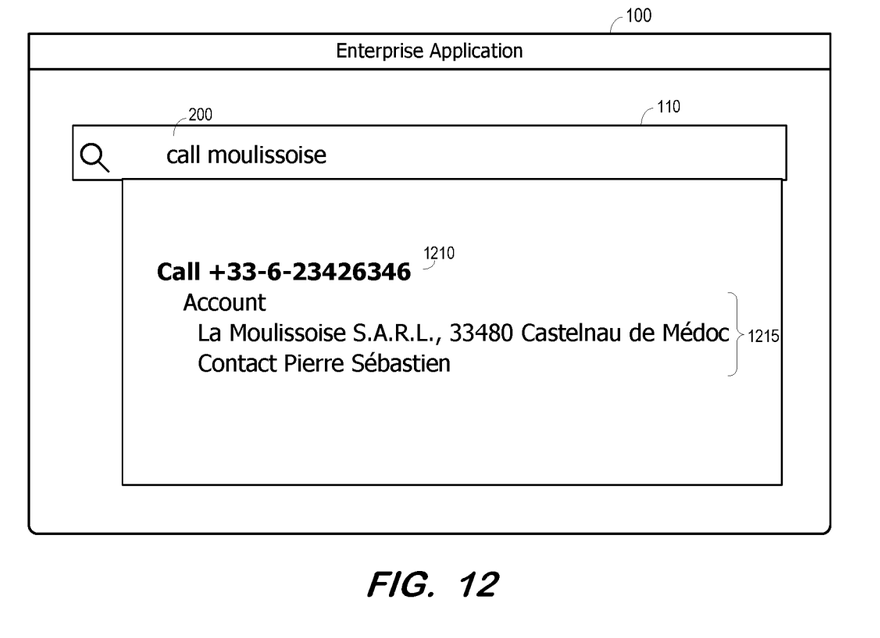
FIG. 12 is a view of a user interface including a query and a corresponding query result according to some embodiments.

FIG. 12 depicts entry of query "call moulissoise" into field 110 of interface 100. Call header 1210 indicates the type of command associated with search result 1215, and search result 1215 indicates a type of data object (i.e., Account) and an instance of the data object (i.e., "La Moulissoise S.A.R.L.") which corresponds to the input query. Search result 1215 may be selected to execute a call to the telephone number of the object instance. The communication function may be executed by an integrated or separate calling application. In either or both of the FIG. 11 and FIG. 12 embodiments, interface 100 may be presented on a mobile client device such as a smartphone or an in-car navigation system.

Figure 13:
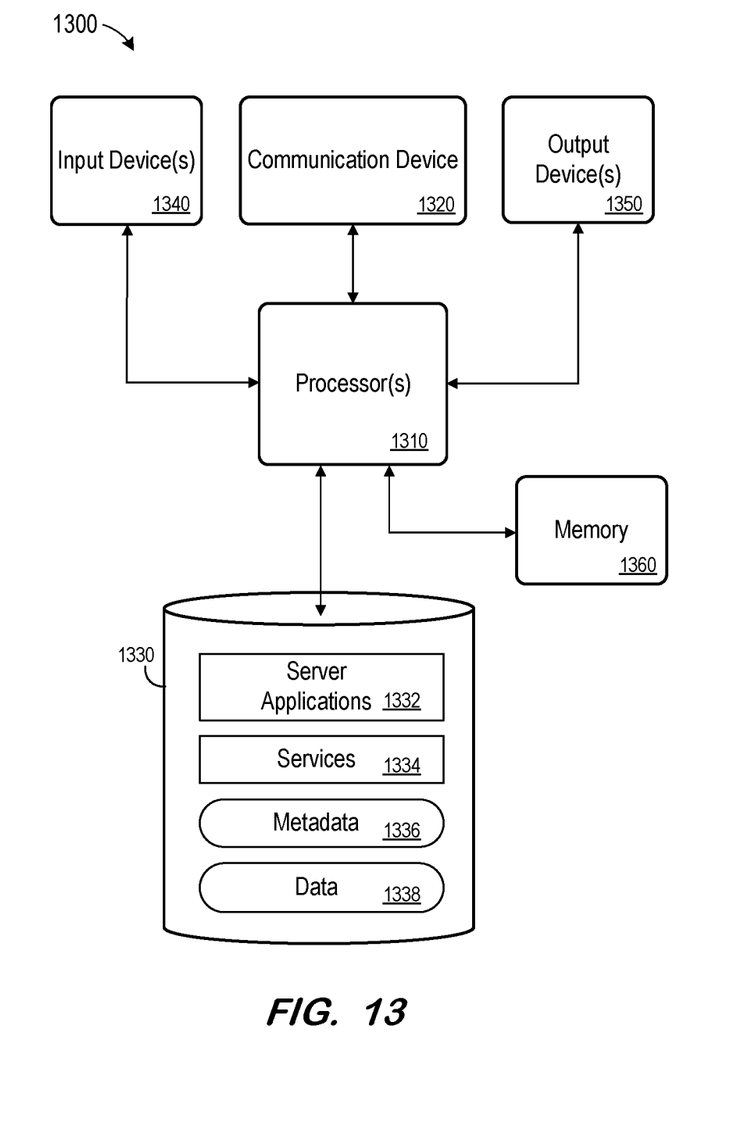
FIG. 13 is a block diagram of an apparatus according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of server 510 in some embodiments. Apparatus 1300 may include other unshown elements according to some embodiments.

Apparatus 1300 includes processor(s) 1310 operatively coupled to communication device 1320, data storage device 1330, one or more input devices 1340, one or more output devices 1350 and memory 1360. Communication device 1320 may facilitate communication with external devices, such as a reporting client, or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen), a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM), Storage Class Memory (SCM) or any other fast-access memory.

Server applications 1332 and services 1334 may comprise program code executed by processor 1310 to cause apparatus 1300 to perform any one or more of the processes described herein. Embodiments are not limited to execution of these processes by a single apparatus.

Metadata 1336 and data 13313 (either cached or a full database) may be stored in volatile memory such as memory 1360. Metadata 1336 may include information describing the data and schema of the data sources of data 1338. Data storage device 1330 may also store data and other program code for providing additional functionality and/or which are necessary for operation of apparatus 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system to:
   receive a query input by a user into a user interface;
   in response to reception of the query, determine a plurality of query results, each of the query results associated with a respective object instance of one of a plurality of object types, where the plurality of object types comprise a master data object type and a report object type; and
   present the plurality of query results to the user, the plurality of query results comprising a first indicator of a first query result associated with an instance of the report object type and a second indicator a second query result associated with an instance of the master data object type, where presentation of the plurality of search results comprises presentation of a plurality of object type indicators each associated with a respective object type, and presentation of each search result adjacent to an object type indicator associated with the object type of the search result, wherein the first indicator is a hyperlink selectable by the user to cause execution of the instance of the report object type to create a report and presentation of the report to the user, and wherein the second indicator is a hyperlink selectable by the user to cause retrieval and presentation of the instance of the master data object type to the user.

2. A computing system according to claim 1, where the plurality of query results comprise a third indicator of a third query result associated with an instance of a work list object type, wherein the third indicator is a hyperlink selectable by the user to cause execution of a work list query associated with instance of the work list object type and to present results of the work list query to the user.

3. A computing system according to claim 2, where the plurality of query results comprise a fourth indicator of a fourth query result associated with an instance of a document object type, wherein the fourth indicator is a hyperlink selectable by the user to cause retrieval and presentation of the instance of the document object type to the user.

4. A computing system according to claim 1, where the plurality of query results comprise a third indicator of a third query result associated with creation of an instance of a master data object type, wherein the third indicator is a hyperlink selectable by the user to cause creation of an instance of the master data object type.

5. A computing system according to claim 1, where the plurality of query results comprise a third indicator of a third query result associated with an action associated with an instance of a master data object type, wherein the third indicator is a hyperlink selectable by the user to cause execution of the action.

6. A computing system according to claim 5, where the action is initiation of a telephone call to a telephone number specified in the instance of the master data object type.

7. A computing system according to claim 5, where the action is initiation of a navigation application to navigate to an address specified in the instance of the master data object type.

8. A computer-implemented method comprising:
receiving a query from a client device;
in response to reception of the query, determining a plurality of query results, each of the query results associated with a respective object instance of one of a plurality of object types, where the plurality of object types comprise a master data object type and a report object type;
transmitting the plurality of query results to the user, the plurality of query results comprising a first hyperlink indicator of a first query result associated with an instance of the report object type and a second hyperlink indicator of a second query result associated with an instance of the master data object type, where transmitting the plurality of search results comprises transmitting a plurality of object type indicators each associated with a respective object type, where each search result is presented adjacent to an object type indicator associated with the object type of the search result;
upon receiving a selection of the first hyperlink indicator, executing the instance of the report object type to create a report and transmitting the report to the user; and
upon receiving a selection of the second hyperlink indicator, retrieving and presentation the instance of the master data object type to the user.

9. A computer-implemented method according to claim 8, wherein the plurality of query results comprise a third hyperlink indicator of a third query result associated with an instance of a work list object type, and upon receiving a selection of the third hyperlink indicator, executing a work list query associated with instance of the work list object type and transmitting results of the work list query to the user.

10. A computer-implemented method according to claim 9, where the plurality of query results comprise a fourth hyperlink indicator of a fourth query result associated with an instance of a document object type, wherein the fourth hyperlink indicator is selectable by the user to cause retrieval and presentation of the instance of the document object type to the user.

11. A computer-implemented method according to claim 8, where the plurality of query results comprise a third hyperlink indicator of a third query result associated with creation of an instance of a master data object type, and upon receiving a selection of the hyperlink third indicator, creating an instance of the master data object type.

12. A computer-implemented method according to claim 11, where the plurality of query results comprise a third hyperlink indicator of a third query result associated with an action associated with an instance of a master data object type, upon receiving a selection of the third hyperlink indicator, executing the action.

13. A computer-implemented method according to claim 12, where the action is initiation of a telephone call to a telephone number specified in the instance of the master data object type.

14. A computer-implemented method according to claim 12, where the action is initiation of a navigation application to navigate to an address specified in the instance of the master data object type.

15. A system comprising:
a client device to:
present a user interface to a user;
receive a query input by the user to the user interface;
transmit the query;
a server system to:
receive the query;
execute the query to determine a plurality of query results, each of the query results associated with a respective object instance of one of a plurality of object types, where the plurality of object types comprise a master data object type and a report object type;
transmit the plurality of query results to the client device, the plurality of query results comprising a first hyperlink indicator of a first query result associated with an instance of the report object type and a second hyperlink indicator of a second query result associated with an instance of the master data object type, where transmission of the plurality of search results comprises transmission of a plurality of object type indicators each associated with a respective object type, wherein the client device is to present each search result adjacent to an object type indicator associated with the object type of the search result; and wherein the first hyperlink indicator is selectable by the user to cause execution of the instance of the report object type to create a report and presentation of the report to the user, and wherein the second hyperlink indicator is selectable by the user to cause retrieval and presentation of the instance of the master data object type to the user.

16. A system according to claim 15, where the plurality of query results comprise a third hyperlink indicator of a third query result associated with an instance of a work list object type, wherein the third hyperlink indicator is selectable by the user to cause execution of a work list query associated with instance of the work list object type and to present results of the work list query to the user.

17. A system according to claim 16, where the plurality of query results comprise a fourth hyperlink indicator of a fourth query result associated with an instance of a document object type, wherein the fourth hyperlink indicator is selectable by the user to cause retrieval and presentation of the instance of the document object type to the user.

* * * * *